(12) United States Patent
Pilu et al.

(10) Patent No.: US 7,106,204 B2
(45) Date of Patent: Sep. 12, 2006

(54) SHARED ATTENTION DETECTION SYSTEM AND METHOD

(75) Inventors: Maurizio Pilu, Bristol (GB); Stephen Philip Cheatle, Bristol (GB); David Arthur Grosvenor, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 8 days.

(21) Appl. No.: 10/834,367

(22) Filed: Apr. 29, 2004

(65) Prior Publication Data

US 2005/0004496 A1 Jan. 6, 2005

(30) Foreign Application Priority Data

Apr. 29, 2003 (GB) ................................. 0309666.6

(51) Int. Cl.
*G08B 23/00* (2006.01)

(52) U.S. Cl. .................... 340/573.1; 348/696; 396/263; 600/595

(58) Field of Classification Search ............. 340/573.1; 600/595; 348/77; 396/263
See application file for complete search history.

(56) References Cited

U.S. PATENT DOCUMENTS

| 4,715,059 A * | 12/1987 | Cooper-Hart et al. ..... 348/14.14 |
| 6,396,509 B1 * | 5/2002 | Cheng .......................... 715/706 |
| 6,873,710 B1 * | 3/2005 | Cohen-Solal et al. ....... 382/100 |
| 2003/0044021 A1* | 3/2003 | Wilkinson et al. ............. 381/56 |
| 2004/0208496 A1 | 10/2004 | Pilu ........................... 396/263 |

OTHER PUBLICATIONS

Adams et al.,"Humanoid Robots: A new Kind of Tool," *IEEE Intelligent Systems*, Jul./Aug. 2000, pp. 25-31.
Aizawa et al., "Summarizing Wearable Video," *IEEE*, 2000, pp. 398-401.
Azuma, "Predictive Tracking for Augmented Reality" (dissertation), 1995, 242 pp., UNC Chapel Hill.
Ballard et al., "Deictic Codes for the Embodiment of Cognition," 55 pp., University of Rochester.
Baron-Cohen, "How to build a baby that can read minds: Cognitive mechanisms in mindreading," *CPC*, 1994, pp. 513-552, vol. 13, No. 5.
Healey et al., "StartleCam: A Cybernetic Wearable Camera," 8 pp., MIT Media Laboratory.
Hoff et al., "Autocalibration of an Electronic Compass in an Outdoor Augmented Reality System," *Proceedings of IEEE and ACM International Symposium on Augmented Reality 2000*, Munich, Oct. 5 and 6, 2000, pp. 159-164.
Kendon, "Some Functions in Gaze-Direction in Social Interaction," *Acta Psychologica*, 1967, pp. 22-63, vol. 26.
Lockerd et al., "LAFCam—Leveraging Affective Feedback Camcorder," 2 pp., MIT Media Lab.
Pavlovic et al., "Visual Interpretation of Hand Gestures for Human-Computer Interaction: A Review," *IEEE Transactions on Pattern Analysis and Machine Intelligence*, Jul. 1997, pp. 677-695, vol. 19, No. 7.
Pentland, "Looking at People: Sensing for Ubiquitous and Wearable Computing," *IEEE Transactions in Pattern Analysis and Machine Intelligence*, Jan. 2000, pp. 107-119, vol. 22, No. 1.
Schaffalitzky et al., "Multi-view matching for unordered image sets, or 'How do I organize my holiday snaps?,'" 17 pp., University of Oxford.
Stielfelhagen et al., "Estimating Focus of Attention Based on Gaze and Sound," *PUI 2001*, Orlando, Florida, 9 pp.
Vertegaal et al., "Why Conversational Agents Should Catch the Eye," 2 pp.

* cited by examiner

*Primary Examiner*—Brent A. Swarthout

(57) ABSTRACT

An attention detection system detects a condition of shared attention of plural persons. The system includes plural body language detectors each associated with a different person for detecting body language of the associated person. An analyzer receives body language information from the body language detectors, analyzes the body language of the persons and determines when said body language information indicates shared attention between the persons. The attention detection system generates a signal that captures an image of the shared attention.

43 Claims, 10 Drawing Sheets

SHARED ATTENTION DETECTION SYSTEM AND METHOD

RELATED APPLICATIONS

The present application is based on, and claims priority to British Application Serial Number 0309666.6, filed Apr. 29, 2003, the disclosure of which is hereby incorporated by reference herein in its entirety.

FIELD OF THE INVENTION

The present invention relates to a method of and apparatus for detecting reactions of animate objects, and particularly to a method of and apparatus for detecting that plural animate objects have a shared attention for an object or thing.

BACKGROUND TO THE INVENTION

Systems and methods for detecting reactions of animate objects, such as humans, animals and certain types of robots, have been developed. The systems frequently employ wearable still and/or video cameras having a computer and sensing system. Wearable still and/or video cameras are known which are head mounted, and can be incorporated in wearable headgear such as a hat, or a pair of sunglasses. Autonomous wearable cameras and other detectors which are able to capture moments of interest by inferring situations of interest to their wearers have the potential to revolutionize the way in which image capture (including visual, sonic and olfactory images) is conducted. However, there are major technological challenges to be faced in how to detect such situations of interest.

Some known wearable image capture devices, in which wearable image capture devices are activated by sensors, include the following:

"StartleCam; A cybernetic Wearable Camera" MIT media laboratory perceptual computing section technical report number 468, in *Proceedings of the International Symposium on Wearable Computers*, pages 42–49, 1998 discloses a wearable video camera having a computer and sensing system which enables the camera to be controlled via both conscious and pre-conscious events involving a human wearer of the camera.

Wearable cameras activated by a sensor which measures brain waves are disclosed in prior art document *"Summarizing Wearable Video" IEEE International Conference on Image Processing, III*: 398–401, Thessalonika, Greece, 2001.

Prior art systems for detecting the attention of a person wearing a wearable camera are known from *"LAFCam—Leveraging Affective Feedback Camcorder"*, A. Lockerd, F. Mueller, *ACM CHI,* 2002. In this disclosure, human body language, including laughing, skin conductivity and facial expressions, are used to record affective data from a camera operator, which is then used to determine which sequences of video will be interesting to a camera operator at a later time.

Prior art methods for estimating the attention of an animate object are also known, for example: *"Estimating focus of attention based on gazed and sound"*, R Stiefelhagen, J. Yang, A. Waibel, *Pproceedings of the Workshop on Perceptive User Interfaces,* 2001

Other prior disclosures relate to work on interpretation of hand gestures by humans, for example see *"Visual Interpretation of Hand Gestures for Human—Computer Interaction: A Review"*. V. Pavlovic, R. Sharma, T Huang, *Department of electrical and computer engineering and the Beckman institute, University of Illinois at Urbana, USA, IEEE Transactions PAMI*, vol. 19, no. 7, pp. 677–695, July 1997.

Another body of prior art research looks at understanding animate object behavior through vision and by analyzing audio is disclosed in *"Looking at People: Sensing for Ubiquitous and Wearable Computing"*, A. Pentland. *IEEE Transactions on Pattern Analysis and Machine Intelligence*, Los Alamitos, Calif., January 2000 pp. 107–118.

Vertegaal et al. have developed conversational agents which are able to detect what an animate object is looking at and act accordingly. Such conversational agents are disclosed in the prior art document *"Why Conversational Agents Should Catch the Eye"*, R Vertegaal, R. Slagter, G.van der Veer, A. Nijholt, *Summary of ACM CHI Conference on Human Factors in Computing, The Hague* 2000.

Prior work also reports experiments that validate and extend the classic model of gaze during dyadic social interaction by Kenden, as exemplified in *"Some function of gaze direction in social interaction"*, A. Kenden, *Acta Physchologica*, 32;1–25, 1967. Using eye trackers and a keyboard which participants used to specify to whom they were paying attention, Kenden et al managed to analyze the relationship between gaze and attention, and found that the probability that the subject was looking at a speaker or a listener in the case where the subject was speaking, was between 77% and 88%.

Computational approaches have been made to implement social attention interpretation models in a humanoid robot such as that disclosed by Barron-Cohen. Such approaches are disclosed in the COG project at the Massachusetts Institute of technology *"The COG project"* V. Adams, C. Breazeal, R. Brookes, B. Scassellati, *IEEE Intelligent systems*, 15(4): 25–31, 2000. Work has also been carried out in the prior art on gaze following and its extension to deictic gestures, to distinguish between animate, inanimate and self-motion. Investigation of pointing gestures and deictic behaviors in general for learning has also been carried out and has provided evidence of the relevance of interpreting social interaction clues in early child development. *"Deictic codes for the embodiment of cognition"*, D. Ballard, M M Hayhoe, P K Pook, R P N Rayo, *Behavioral Brain Science*, 20: 723–742, 1997.

Known work in the field of attention detection focuses on situations from a first person perspective, that is, from the perspective of a person or other animate object whose attention is being captured, or alternatively from the perspective of an external observer, observing a person who may be wearing an image capture device, that is, from an 'observer perspective'.

SUMMARY OF THE INVENTION

In accordance with one aspect of the invention, a method of enabling shared attention to be detected between first and second animate objects comprises detecting attention information of the first and second objects by using first and second devices, respectively. The attention information is exchanged between the first and second devices.

Another aspect of the invention relates to an attention detection system for detecting a condition of shared attention of first and second animate objects comprises first and second body language detectors for respectively detecting body language of first and second of the objects. An analyzer receives body language information from the first and second body language detectors and analyzes the body language of the first and second objects to determine that the body language information indicates a situation of shared attention between the first and second objects.

A further aspect of the invention concerns a method of capturing at least one image in a situation of shared attention involving first and second animate objects. The method comprises monitoring at least one parameter associated with each of the objects. A determination is made from the monitored parameters that the objects have a shared attention situation. An image capture device is activated in response to the determination of a shared attention situation. The image capture device can be of an optical image, a sound image or an olfactory image.

An additional aspect of the invention relates to an image capture system capable of capturing images under conditions of shared attention between a plurality of animate objects. The system comprises a wearable image capture device adapted to be worn by a first of the objects and a first set of sensors for detecting behavioral aspects of the first object. A second set of sensors detects behavioral aspects of a second of the objects. An analyzer responds to the detected behavioral aspects sensed by the first and second set of sensors to determine a situation of shared attention between the first and second objects in response to the detected behavioral aspects sensed by the first and second set of sensors.

An added aspect of the invention concerns a portable image capture system adapted to be worn by a host animate object. The device comprises a host portable image capture device and a sensor arrangement for sensing at least one behavior aspect of the object. An analyzer analyzes outputs of the sensor arrangement and monitors aspects of behavior of the object. The analyzer receives a second set of sensor signals for describing behavior aspects of a second object and analyzes the first and second sets of sensor signals to determine a situation in which the first and second sets of sensor signals exhibit a correlation of behavior between the first and second objects.

Still another aspect of the invention relates to an attention detection system for detecting a shared attention between two or more animate objects. The system comprises plural sensor systems, each associated with one of the objects and being arranged for sensing information concerning a focus of attention of the sensor associated with the object. At least one data processing component receives information from at least two of the sensor systems and determines conditions under which at least some of the animate objects associated with at least two of the sensor systems share the same focus of attention.

Yet a further aspect of the invention concerns an image capture system comprising at least one image capture device and first and second detectors for respectively detecting body language of first and second animate objects. An analyzer for the body language of the first and second animate objects derives a signal in response to the first and second detectors determining a situation of shared attention between the first and second animate objects. The image capture device captures an image of the shared attention between the first and second objects in response to the signal derived by the analyzer.

The body language detector preferably comprises a sensor arrangement for at least one of (1) eye gaze direction of the animate object; (2) body direction of the animate object; (3) head motion of a structure of the animate object carrying an optical, sonic or olfactory detector; (4) the orientation direction of a limb of the animate object in three dimensions; (5) facial expression of the animate object; and (6) aspects of a noise originating from the animate object and which indicates a raised level of attention of the object.

In a preferred embodiment, the detecting step includes detecting a single final direction of attention shared by the first and second animate objects from a determination of detected joint ballistic direction information detected for each of said first and second objects.

The detecting step can also include detecting a direction shift of a joint smooth gaze by the animate objects as a result of the objects following a moving object of shared attention. In one embodiment, at least one of the animate objects determines whether or not to send attention information to an attention information detecting device. The attention information detecting device can be at a location different from the animate object that performs the determining step or at the same location as the object that performs the determining step. Each of the objects can determine with whom it communicates the exchangeable information. Each device determines whether to exchange attention information with another of the devices based upon an analysis of contextual information concerning the environment where the device is located.

In addition, a determination can be made about whether or not to send the exchange information by analyzing information based on the type of detected attention clue.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE DRAWINGS

Figure 1:
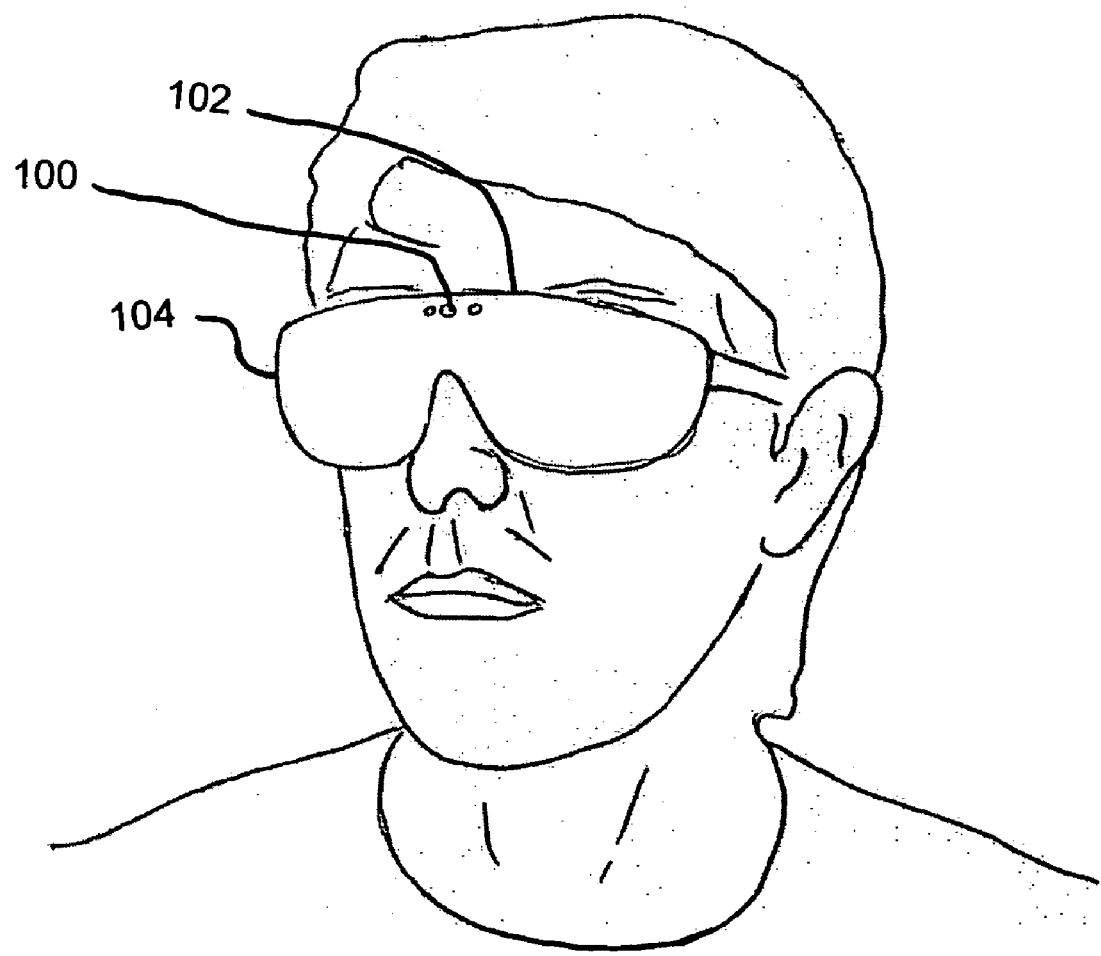
FIG. 1 is a schematic diagram of a camera device carried by a pair of sunglasses.

There will now be described by way of example a specific mode contemplated by the inventors. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the description.

Specific embodiments herein aim to address situations of shared attention between two or more users, including detection of shared attention situations.

Social situations which involve the attention of more than one person are common. For example, at a wedding reception, a person may give a speech, in which case the attention of many persons at the reception is focused on the person giving the speech. Similarly, at a sports event, the attention of many persons is focused on a small number of players. A shared attention situation can involve the shared attention of as few as two individual persons concentrating on a common object, for example as may occur (1) in a game of chess, (2) where two persons go shopping together, or (3) where two persons share an activity.

Humans interact by shared attention from an early age, within a few months of birth. Infants, soon after birth exhibit signs of shared direction of eye gaze, and mimicking of pointing movements of a person.

Situations of interest to a human, whether they draw the attention of the human subject or not, can be determined broadly in two ways. Firstly, by detecting situations which may be interesting from the observation of events or objects in an environment, and secondly, by directly or indirectly measuring a subjective level of interest of a person, or of a third party.

Specific embodiments and methods according to the present invention aim to use the human physiological behavior of shared attention as a stimulus for automatic capture of an image. Specific embodiments according to the present invention address the detection of shared attention between two or more human individuals.

In this specification, by 'shared attention', it is meant any situation whereby two or more individual animate objects each direct attention to a common object or subject. The shared attention of the two or more animate objects may be independent from the nature of the object or subject of their attention.

The two or more individual animate objects may temporarily or transiently share attention, for example by jointly following a passing object, or jointly looking at a static object. Attention may be shared over a time period in the range one second to a few seconds, or over a longer period. Attention may be shared by two or more animate objects for a time duration over which animate objects can physically maintain attention. This may range anywhere between periods of less than a second to periods of a few minutes and beyond, up to an hour or more. Shared attention may include joint reflex actions, for example two or more animate objects may each adopt a nervous or a defensive posture, for example by cowering or by persons shielding their faces in reflex response to an attention attracting event, for example an explosion, a flash or a loud noise or a strong shock or vibration. Shared attention may also include joint study of a common object by two or more persons over a period, for example in watching a game of sport, or a film screen.

Two or more sensing systems worn by animate objects may communicate with each other. One or both animate objects may wear an image device. The sensing systems detect their mutual presence, and exchange information concerning their respective wearers' head motion, head pointing direction and views and general body language. An attention detection processor integrates the information to detect situations of shared attention between users. Situations of shared attention may include animate objects pointing in the same direction, simultaneous or slightly temporally delayed head turning in the same direction, and joint smooth visual pursuit of an object in a field of view by two or more animate objects.

Referring to FIG. 1 herein, there is illustrated schematically a wearable camera device 100, incorporated into an item of headgear, in this case on bridge 102 of a pair of sunglasses 104.

In this specification, the term 'camera device' refers to an image capture device suitable for taking still image frames, and/or moving picture scenes, and includes video cameras. Where references to a 'camera device' are mentioned in this specification, it is to be appreciated that a camera device is one instance of a broader range of image capture devices.

Whilst a pair of sunglasses is illustrated for carrying a wearable camera device, in other embodiments, a wearable camera can be worn on a host person's head mounted in a different manner, for example mounted on the front of a hat or cap, or mounted on a head set adapted for wearing on a host person's head.

As a host person wearing the camera device directs his eyes and ears towards items which interest him or catch his attention, the host person moves his head, thereby directing the camera device in a direction in which the attention of the host person is drawn.

Head motion sensors detect movement of the host person's head. In response to detecting that there is a situation in which the attention of the host person is shared with one or more other persons, the camera can be activated to capture an image or image sequence, in the viewing direction of the host person.

Figure 2:
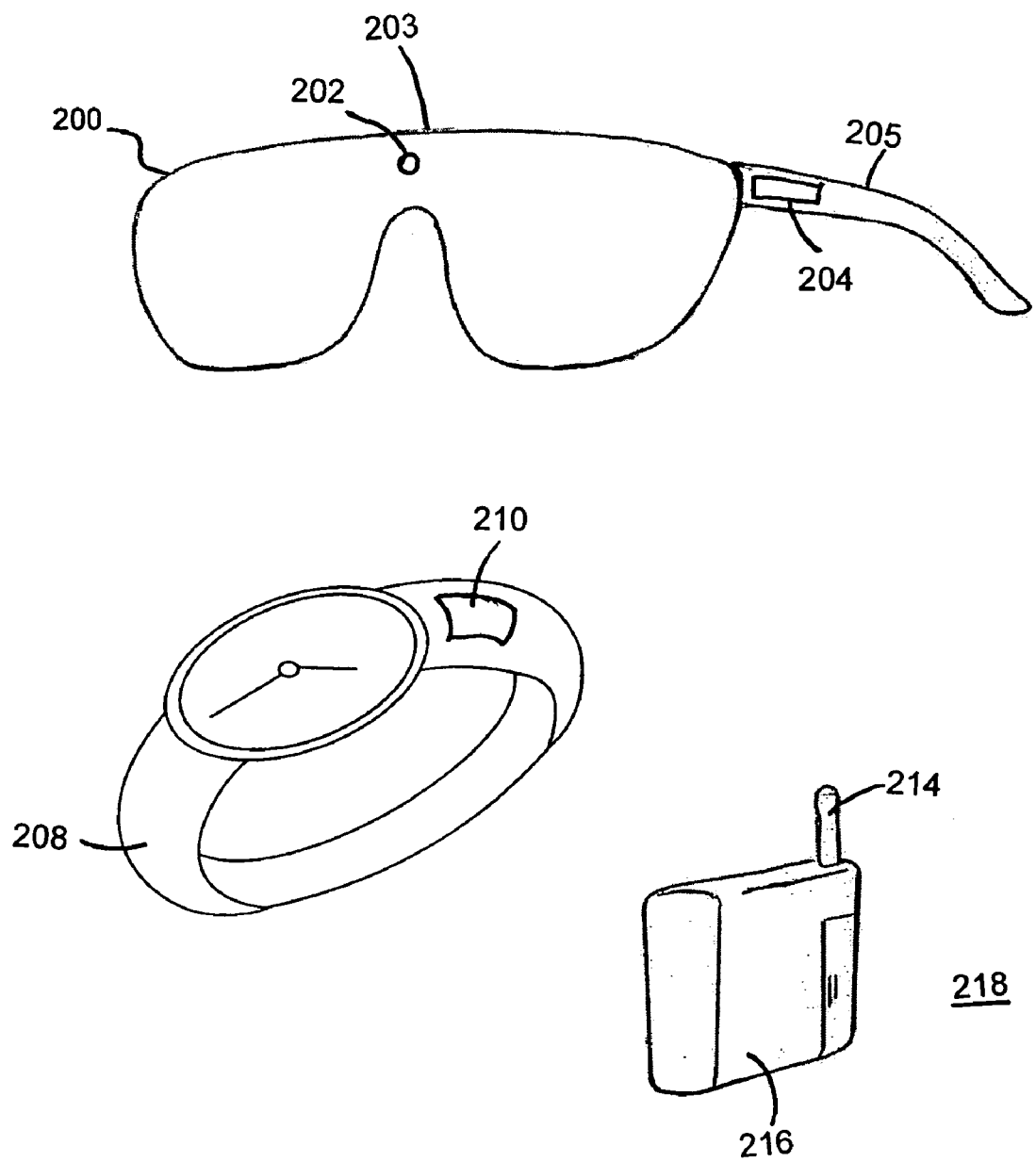
FIG. 2 is a diagram of a portable image capture system capable of capturing images under conditions of shared attention between one or more persons other than the wearer of the image capture system.

Referring to FIG. 2 herein, there is illustrated schematically a human wearable image capture system comprising a pair of sunglasses 200 including image capture device 202 on the bridge 203 of the sunglasses and head motion sensor device 204 on the earpiece 205 of the sunglasses; a wrist watch strap 208 including a limb motion sensor device 210; and a portable, battery operated wireless transceiver (not shown) including antenna 214, a speaker and a microphone (not shown) behind baffles (not shown) in housing 216 and that forms an attention detection module 218. Sensors 204 and 210 include low power wireless transmitters for sending signals that antenna 214 receives and supplies to processing devices (illustrated in FIG. 3) included in housing 216.

The head mountable image capture device 202 and the attention detection module 218 can be provided in the same physical item, such as a pair of sunglasses, a cap or hat or the like, or the attention detection module can be provided separately as a discrete item with which the camera device communicates. In one embodiment, housing 216 can clip on to a person's clothing or be carried in a pocket, or on a belt, and be portable on a wearer's body. However, in the general case, the attention detection module 218 need not be worn on a person's body, but can be positioned remotely from a person, provided that the attention detection module is capable of communicating with the image capture device 202 and motion sensor device 204.

Limb motion sensor 210 can be carried on wearable items other than a wrist watch strap, such as a glove or shoe. For detecting finger-pointing motion, a glove device includes movement sensors in each finger of the glove. The glove device can be similar to a known sensor glove device for measuring arousal as disclosed in *'LAF cam-leveraging effecting feedback camcorder'* as referenced herein before.

Figure 3:
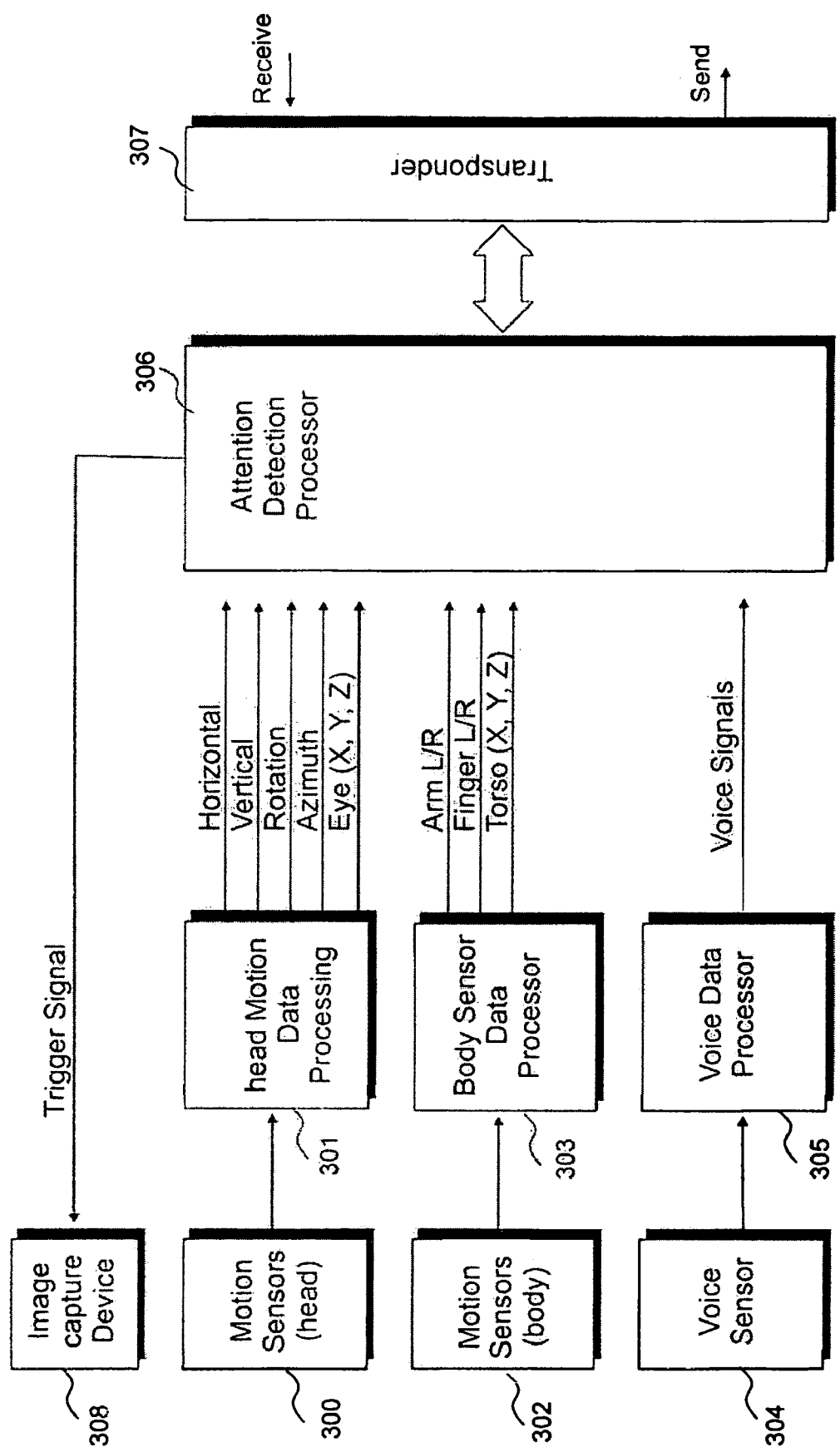
FIG. 3 is a block diagram of a portable image capture apparatus carried by a host wearer and capable of capturing images under conditions of shared attention between the host wearer and one or more other persons.

FIG. 3 is a block diagram of components of a shared attention image capture system according to a specific embodiment of the present invention. The system comprises a first set of motion sensors 300 for detecting motion of a wearer's head, as derived by output signals of sensors 204 and coupled to antenna 214; a head motion data processing device 301 for processing data signals from the head motion sensors 300; a set of body motion sensors 302 for sensing body movements as derived by output signals of sensor 210 and coupled to antenna 214; a body sensor data processing device 303 for processing sensor signals antenna 214 receives from the body sensors 302; a voice sensor device 304 for sensing a wearer's voice as derived by the microphone and transceivers included in module 218; a voice data processor device 305 for processing the output of the voice sensor 304; an attention detection processor 306 for receiving processed data from the head motion data processor 301, body data processor 303 and voice data processor 305; a transponder 307 for communicating with one or more other shared attention image capture systems; and an image capture device 308 for capturing two dimensional digital image data in a single frame or a sequence of frames as derived by image sensor 202, including optionally a video sequence. Device 308 is activated to an on condition in response to a signal generated by the attention detection processor 306.

The head motion sensors 300 generate signals representing horizontal head movement, vertical head movement, head rotation (pan of view), azimuth, and eye gaze direction in pan, and azimuth, represented as a sequence of X,Y,Z coordinate data.

The body motion sensors 302 generate data describing arm movement for the left and/or right arms, including elevation, direction and acceleration. The body motion sensors 302 also optionally collect finger movement data. Body motion sensors 302 can also be used to collect torso movement data generated as three-dimensional X,Y,Z co-ordinate data.

A voice sensor 304, for example in the form of a microphone, generates audio signals which are processed by voice data processor 305 in order to generate voice signals.

The attention detection processor 306 receives head motion data (including eye motion data) from processor 301, body motion data from processor 303 and/or voice motion data from processor 305 from the set of wearable sensors worn by a person. Additionally, via transponder 307, the attention detection processor 306 can communicate with one or more other sets of sensors of one or more other persons, so that the attention detection processor receives body language data from a plurality of persons including the wearer and at least one other person in real time.

The motion of each of a plurality of persons, each wearing a system as described with reference to FIGS. 2 and 3 is detected, and the respective motions of those persons is compared to determine whether there is an element of joint motion between any two or more of those persons. Examples of a joint motion include two or more persons smoothly pursing an object in a common environment of those two persons. For example, two persons may smoothly or gradually change their attitude and direction of stance or attention, to follow a common moving object in, for example the far distance. Alternatively, a common motion between a plurality of persons of a ballistic nature can be determined. Examples of ballistic movements include rapid eye movement, as a person's attention is raised, or rapid changes in direction of a person, to point towards a common object. For example, a person may exhibit a ballistic motion over a time scale of 0.25 seconds to 1 second, in a scenario wherein a sudden stimulus, for example a loud noise, an explosion, or a flash of light is experienced in an environment containing a plurality of persons.

In some embodiments, image based motion tracking systems provide low speed and/or absolute motion information which is difficult to provide using accelerometers. For example, a hand-based motion tracking system, such as a sensor embedded glove device, can provide absolute motion information in three dimensions of a person's hand. Devices which give a measure of absolute orientation, for example compasses, can determine and track the orientation of a wearer's head. Such devices are known in the art, for example in *'Auto calibration of an electronic compass in an out door augmented reality system'* B. Hoff, R. Azuma, proceedings of international symposium on augmented reality 2000, Muchen, Germany $5^{th}$ to $6^{th}$ Oct. 2002 page 159–164.

The attention detection processor 306 can include firmware or software algorithms for combining inertial and image measurements for head motion detection. Known techniques for combining inertial and image measurements for head motion detection are disclosed in *'Predictive tracking for augmented reality'*, R. Azuma, Ph.D. thesis, University of North Carolina, Chapel Hill, USA, 1995.

A processing device as shown in FIG. 3 can be embodied in a variety of ways. In one embodiment, each processor is fabricated as an application specific integrated circuit (ASIC). In another embodiment, each processing device is a software program code for controlling a general purpose computing platform, for example a portable computing platform such as a palm top or hand held computer device.

Figure 4:
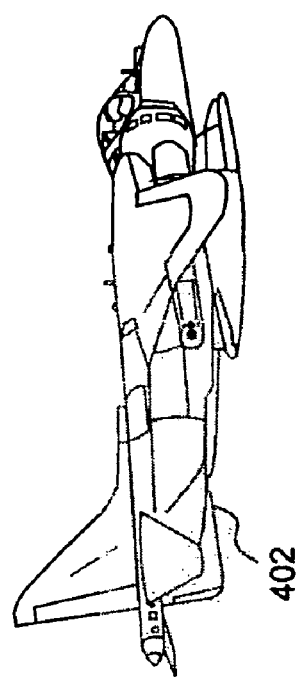
FIG. 4 is a schematic diagram of a situation of shared attention between two or more persons, each wearing an image capture system as described with reference to FIGS. 1 and 3.
Figure 4:
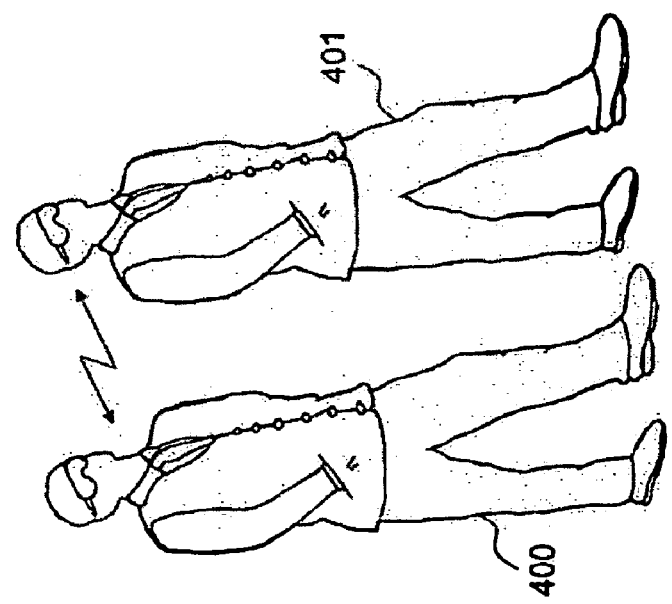

Referring to FIG. 4 herein, there is illustrated schematically first and second persons 400, 401 who are close to each other and each of whom is wearing a set of body sensors 204 and 210, and a head mounted image capture device 202. Each person also carries an attention detection module 218, which is worn on the person's body, or integrated into an item of headgear. Each attention detection module 218 receives signals from a set of body sensors of the corresponding host wearer, as well as a set of body signals of the other person. Each attention detection module 218 includes a processor 306 that analyzes the body signals of the host wearer and the body signals of the other person, to determine whether both of persons 400 and 401 have their attention directed in a similar way. For example as shown in FIG. 4, a passing jet aircraft 402 is attracting the attention of both persons 400 and 401. The attention detection processor 306 on each of persons 400 and 401 detects that the attention of both persons is drawn by a common object, and generates an image capture signal for activating image capture device 202 so device 202 on at least one of persons 400 and 401 captures the image of aircraft 402.

Figure 5:
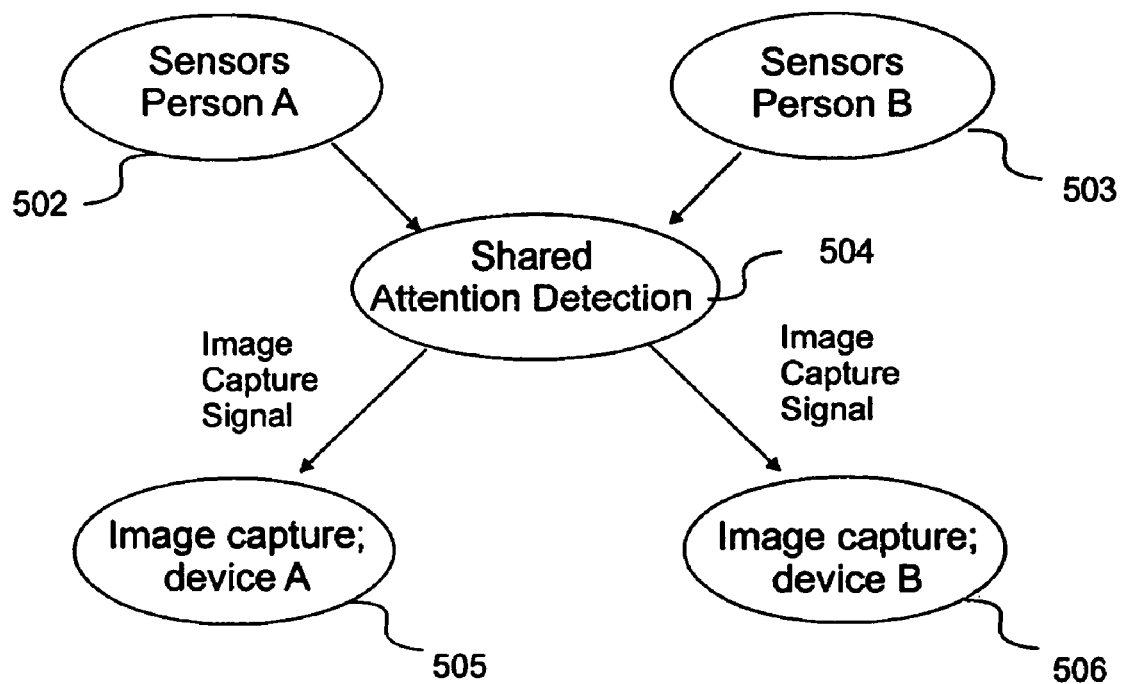
FIG. 5 is a flow diagram, in overview, of data processing stages for carrying out image capture, and activated by a situation of shared attention between a plurality of persons.

Referring to FIG. 5 herein, there is illustrated a flow diagram of operations performed by the apparatus of FIGS. 2 and 3 for carrying out image capture, activated by conditions of a shared attention between first and second persons A and B of FIG. 4.

A first set of sensors 204 and 210 worn by first person A generates sensor signals 502 describing the body language of first person A. Similarly, a second set of sensors 204 and 210 worn by second person B generates a second set of sensor signals 503 describing the body language of the second person B. Both the first sensor signals of first person A and the second sensor signals of second person B are received by one or more attention detection processors 306, carried in module 218 of at least one of persons A and B. The attention detection processor 306 performs processing step 504 to detect whether there is any shared attention between the first and second persons, by analyzing the sensor signals generated by sensors 204 and 210 of persons A and B. Processor 306, during step 504, determines if there is shared attention of persons A and B by sensing the body language of each of first and second persons A and B.

Processor 36 responds to its determination of shared attention of persons A and B by sending an image capture signal 505 to a first image capture device 202 worn by first person A. Similarly, a second image capture signal 506 can be sent to a second image capture device 202 worn by a second person B. Image capture signals can be sent to either of the image capture devices 202, or both of the image capture devices.

In the general case, attention detection processing can be carried out by a single attention detection module 218, and the physical location of that attention detection module can be worn by first person A, or worn by second person B, or, where the sensor set has wireless transmitter capability, the attention detection module can be at a position remote from both first person A and second person B.

In order to obtain an image which is captured from the perspective of the first person and/or the second person, each of the image capture devices 202 is worn by the corresponding respective host first or second person.

A situation of shared attention is detected with the aid of sensors 204 and 210 of both persons. Signals resulting from the sensors are communicated to at least one shared attention detection module 218.

Figure 6:
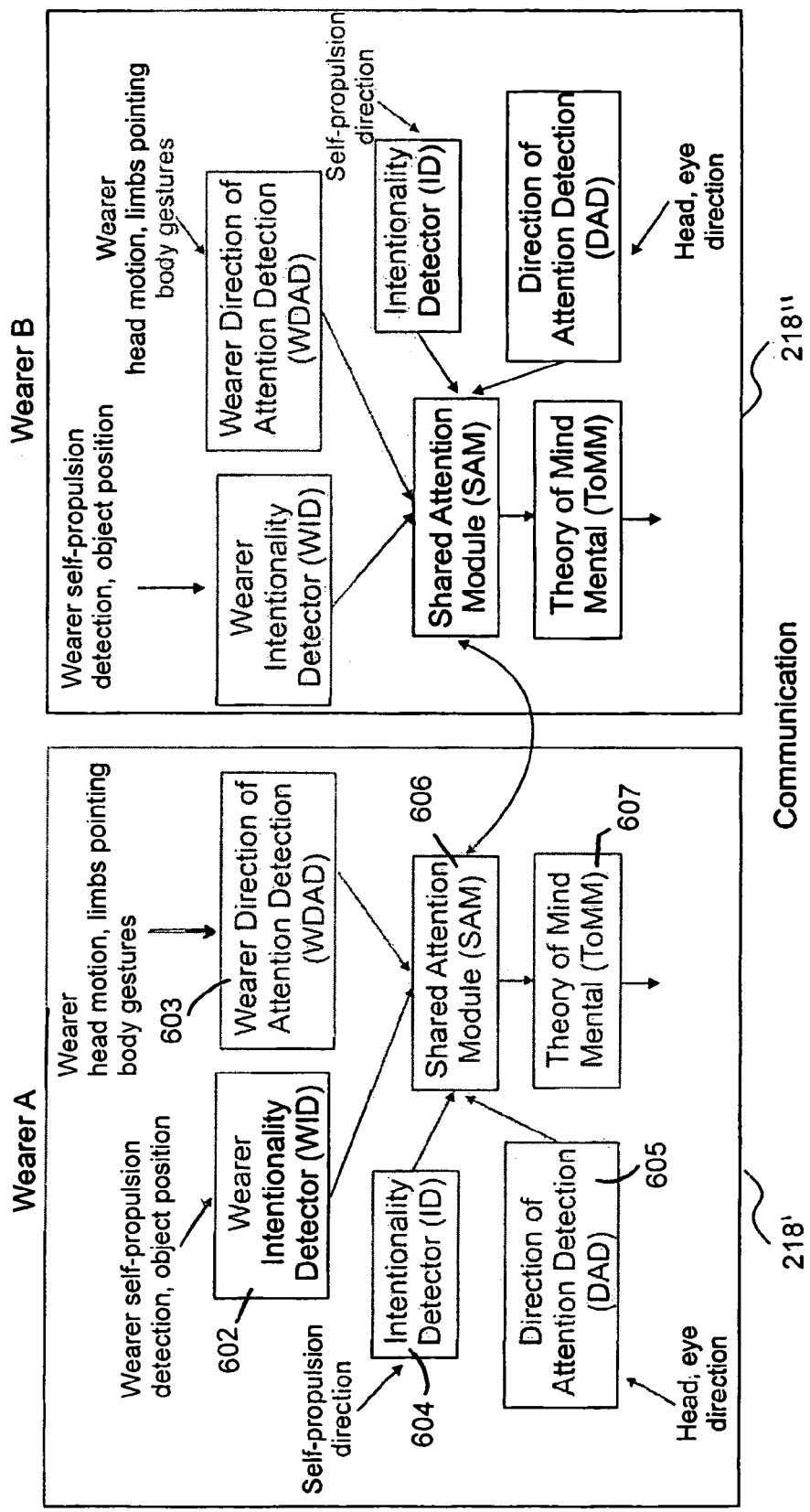
FIG. 6 is a high level flow diagram of two attention detection modules, each based on a known Barron-Cohen model, for exchanging attention clue data and determining whether or not to capture an image, based upon a level of shared attention between a plurality of persons.

FIG. 6 is a high level flow diagram of a pair of attention detection modules 218' and 218" on persons A and B that are communicating with each other. The various operations of FIG. 6 are performed by the attention detector processor 306 included in each of modules 218' and 218". The various operations of processor 306 are software modules included in processor 306.

Each of attention detection modules 218' and 218" is capable of communicating with one or more other attention detection modules, as shown, so that a plurality of such attention detection modules can communicate with each other to share information concerning the attention levels of two or more persons, in order to determine whether a situation of shared attention exists. In the case of multiple interacting host wearers, multiple attention detection modules, each as shown in FIG. 6, communicate with each other.

Each attention detection modules 218' and 218" comprises a wearer intentionally detector (WID) module 602 for detecting and estimating the intention of a person; a wearer direction of attention detection (WDAD) module 603 for estimating the direction in which a person's attention is directed; an intentionality detector (ID) module 604 for determining a person's intention from sensors 204 which detect a person's self propulsion; a direction of attention detection (DAD) module 605 for determining a person's attention direction based on an analysis of a person's head orientation and direction of eye gaze; a shared attention module (SAM) 606; and a theory of mind module (TOMM) 607.

In the specific embodiment shown in FIG. 6, each of attention detection modules 602, 604, 605 and 606 is based on a known attention detection system. For example, one such system, as described with reference to FIG. 6, is based on a modified Barron-Cohen model [S. Baron-Cohen, *"How to build a baby that can read minds; cognitive mechanisms in mind reading"* Cahiers de Psychologie Cognitive, 13, pp. 513–552 1994.]

Each of attention detection modules 602, 604, 605 and 606 detects shared attention situations between two or more persons by observing the host wearer and one or more third parties. Used alone, and without communicating with sensors worn by other persons, each of attention detection modules 602, 604, 605 and 606 is restricted to a first person perspective, in response to antenna 214 receiving signals from a single person. The first person perspective of each attention detection module limits the range of attention situations which are detectable. However, when two similar attention detection modules 218' and 218" exchange information concerning head and body motion of each of their respective wearers, a greater degree of information is available to each of attention detection modules 218' and 218" to infer shared attention than if each attention detection modules 218' and 218" received only input body language signals from its own host wearer.

The following non-exhaustive selection of attention clue signals represents signals from which shared attention of two persons can be deduced.
  a. Joint head motion: a strong indication of a shared attention situation between two or more persons occurs when they move their heads so that their faces are directed towards a common object.
  b. Eye gaze: a shared attention between two or more persons occurs when they direct their eyes at a common object.
  c. Joint motion of eye gaze: the eye gaze of two or more persons tracking at a similar rate of pan indicates they are probably following a common moving object and share attention on that object.

Several techniques are known in the prior art for performing view matching from an arbitrary viewpoint. For example, *"Multi-view matching unordered image sets, or how do I organize my holiday snaps?"*, F. Schaffalitzky and A. Zisserman, Conference on Computer Vision 2002 PP 414–431 discloses a method of performing view matching from an arbitrary view point which can be used to determine if two people are looking at a same point in space. Such known techniques can be incorporated into the attention detection module to determine a situation of shared attention.

The attention detection modules 600, 601 each have to take into account attention clues given by a host wearer (an observed subject of the attention detection module) and other external people with whom the host wearer interacts. For this reason, in addition to the intentionality detector module 604 and the direction of attention detection module 605, each of modules 218 and 218' includes two similar modules, i.e., the wearer intentionality detection module 602, and the wearer direction of attention detection module 603. The wearer intentionality detection module 602 estimates signals of self motion by the wearer and animate or inanimate objects around the wearer, and differs from the intentionality detector 604, in that the attention clues to which module 602 responds are measured from the host wearer's perspective, whereas the intentionality detector 604 measures the attention clues from the perspective of an observer of the host wearer. The wearer direction attention detection module (WDAD) 603 responds to attention clues of the host wearer, such as deictic head motion, pointing with limbs, and like attention clues, detected from the host wearer's perspective. The direction of attention detection module 605, in the role of observer, is able to deduce the attention of the host person both in isolation, and as the host person interacts with other external parties, in response to signals that sensor 204 derives and to which module 605 responds.

Transfer of information between two attention detection modules as shown in FIG. 6 takes place at various levels of information. The choice of level of information exchanged between attention detection modules is specific to the particular embodiment.

Particular instances of the information types which can be exchanged between two attention detection modules 218' and 218" include the following.

Head motion information.—Information describing the motion of a wearer's head in 3 dimensions. The head motion can include slow gradual motion (smooth motion) information, and/or ballistic motion, i.e. rapid head movement. The head motion can include rotational motion about a person's main spinal axis, azimuth motion of the head, that is tilting of a person's head up and down, as well as side ways tilting motion to a person's left shoulder or to a person's right shoulder.

Head pointing direction information—since most humans have binocular vision, the pointing direction of a person's face gives a broad indication of a person's attention direction.

Direction of view information—direction of view information is typically more dynamic than head motion information, because a person, upon being stimulated, tends to move his eyes toward an object before any head movement occurs.

Body direction information—the direction of movement of a person's body contains many clues about the attention of the person. For example, a person moving towards an object is usually a clue that the person is interested in that object.

Limb direction information—a person raising his limb, for example his arm, may indicate the person is interested in an object in a particular direction, for example a person reaching out an arm in order to touch an object.

Digit pointing direction—a person actively pointing towards an object using one or more fingers, may indicate he is interested in an object on a desk or within the person's immediate environment, or in further object(s), for example, object(s) in the medium or far distance.

The above information types are exchanged between attention detection modules in the various methods and apparatus embodiments disclosed herein. Further, a resolution of such information, including whether the information is dynamically continuous, or dynamically transient, and time information, giving a rate of change of movement can also be exchanged.

Each individual attention detection module 218' or 218" shown in FIG. 6 is capable of operating in only a first person perspective mode, in which the attention detection module does not utilize information received from other attention detection modules, and cannot share information with other attention detection modules. Alternatively, at the wearer's option, modules 218' and 218" can share attention information with each other to operate in a shared attention mode.

In the shared attention mode, one or both of attention detection modules 218' and 218" detects, determines or infers situations of shared attention between a plurality of persons.

Figure 7:
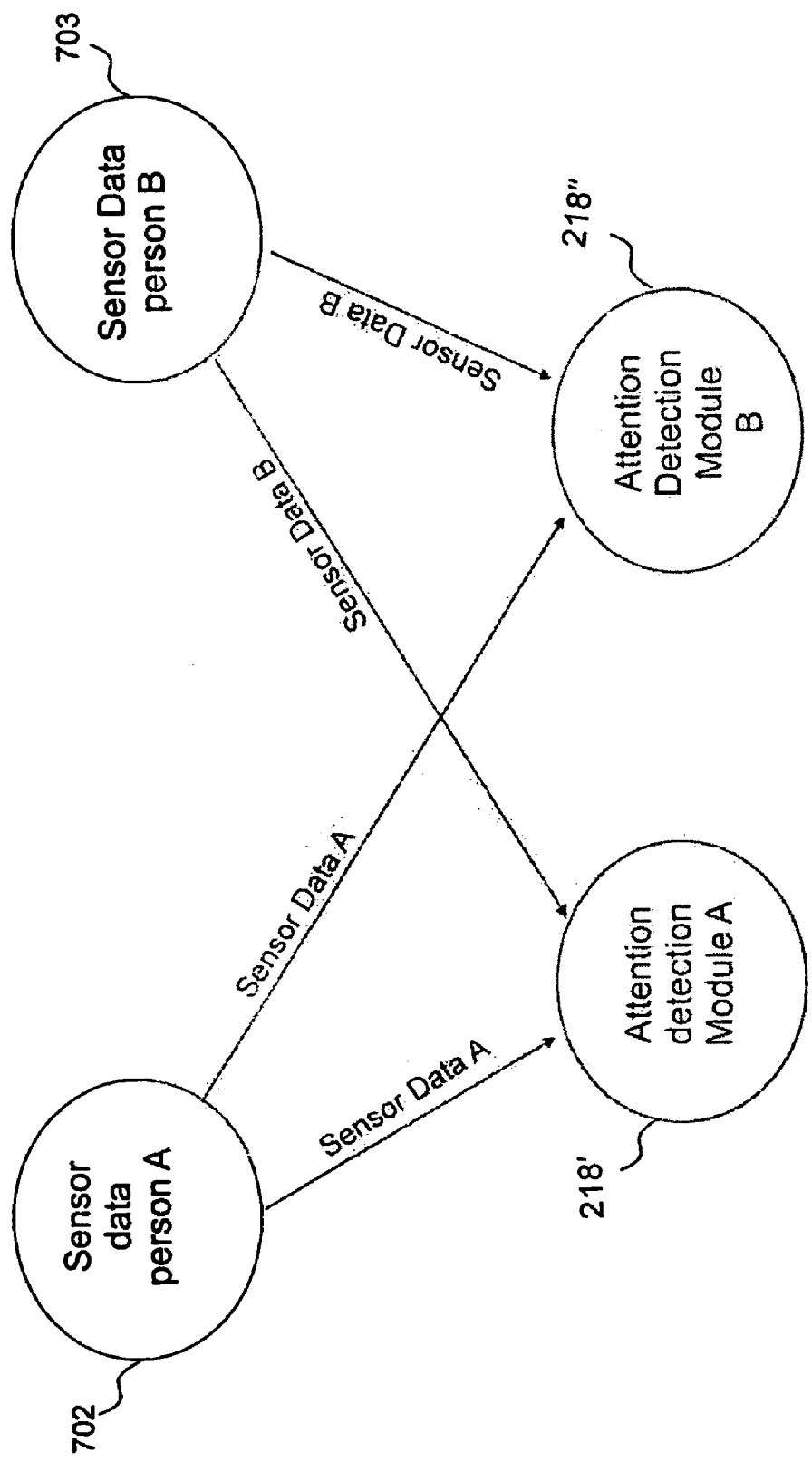
FIG. 7 is a flow diagram including operation of first and second attention detection modules, in which sensor data for a plurality of persons is broadcast and received by the attention detection modules.

FIG. 7 is a flow diagram of the exchange of information between two personal image capture systems, respectively carried by persons A and B. The personal image capture system that person A carries includes attention detection module 218' and sensors of the type described supra as sensors 204 and 210 for deriving sensor data signals. Thus, first attention detection module 218', resident on person A, receives sensor signals 702 that indicate the attention of person A, and sensor signals 703 that indicate the attention of a second person B. Similarly, second attention detection module 218", resident on person B, receives sensor signals 702 from the sensors worn by the first person A, and sensor signals 703 from the sensors worn by the person B. Each of attention detection modules 218' and 218" performs autonomously an analysis of sensor data for a plurality of persons, including the host person who is carrying the attention detection module.

Figure 8:
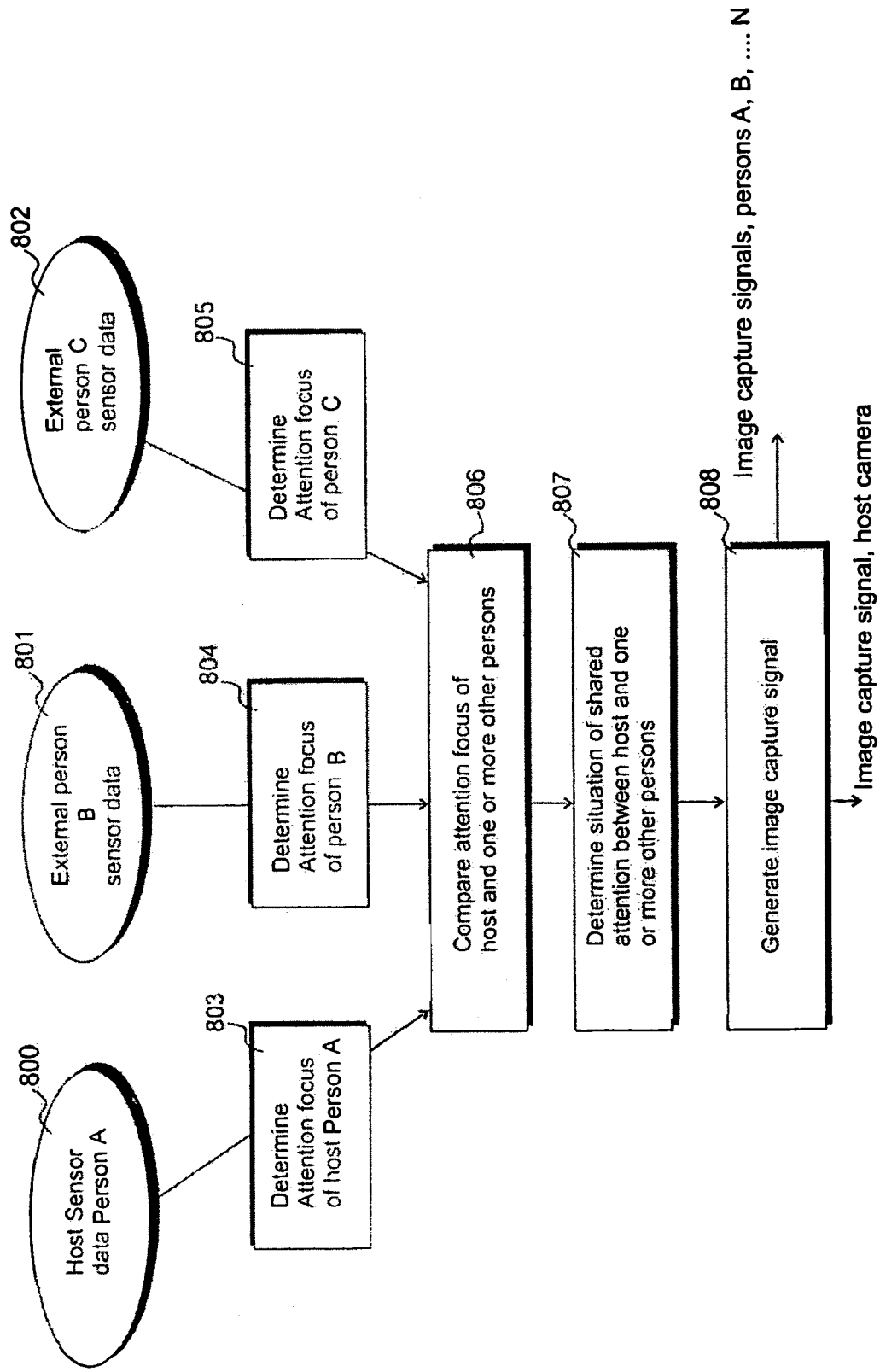
FIG. 8 is a flow diagram of operations carried out by an attention detection module operating in a first mode of operation as described with reference to FIG. 7.

FIG. 8 is a flow diagram of data processing steps performed by attention detection module 218' under the mode of operation described with reference to FIG. 7, and applicable to host person A, as well as external persons B and C. In the situation of FIG. 8, sensors 204 and 210 that persons A, B and C carry cause signals 800, 801 and 802 to be transmitted to antenna 214 of module 218'. During steps 803, 804 and 805 module 218' responds to signals 800, 801 and 802 to separately determine the attention focus of persons A, B and C during steps 803, 804 and 805, respectively. Module 218' determines the attention focus of each of persons A, B and C, based on the previously discussed bases, i.e., on (1) propulsion data about the person (e.g. in the forward, backward and sideways directions), (2) object position data, (3) body gesture data, and (4) eye view and tracking data.

During step 806 attention detection module 218' continuously and in real time compares the attention focus of the host person A, as derived during step 803, with the attention focus data of persons B and C, as derived during steps 804 and 805, respectively. In the second case where there are N external people, operation 806 compares the attention focus of person A with each of the other external persons B to N. As a continuous on-going process, in stage 807 attention detection module 218' determines the situation of shared attention between the host wearer A and any one or more of the other persons B to N from whom antenna 214 of module 218' receives sensor signals. When module 218' determines that a situation of shared attention has occurred (step 808), attention detection module 218' generates a set of signals for triggering image capture from image capture device 202 that host wearer A carries. Module 218' transmits an image capture trigger signal to each of the other modules that step 807 indicates have a shared attention with person A, e.g., module 218' transmits a signal to module 218" in response to step 807 of module 218' indicating persons A and B share attention to the same situation. Typically module 218" responds to the image capture trigger signal that module 218' transmits to activate the image capture device 202 that person B carries. Alternatively, module 218" supplies the image capture trigger signal from module 218' to generate image capture signal operating step 808 that responds to step 807 at module 218". If step 807 at module 218" indicates there is no shared situation between persons A and B, activation of the image capture device 202 associated with person B is inhibited and device 202 that person B carries is not activated. The image capture devices that persons A and B carry automatically capture an image, either a still image or a video sequence, in response to the image capture signal.

Figure 9:
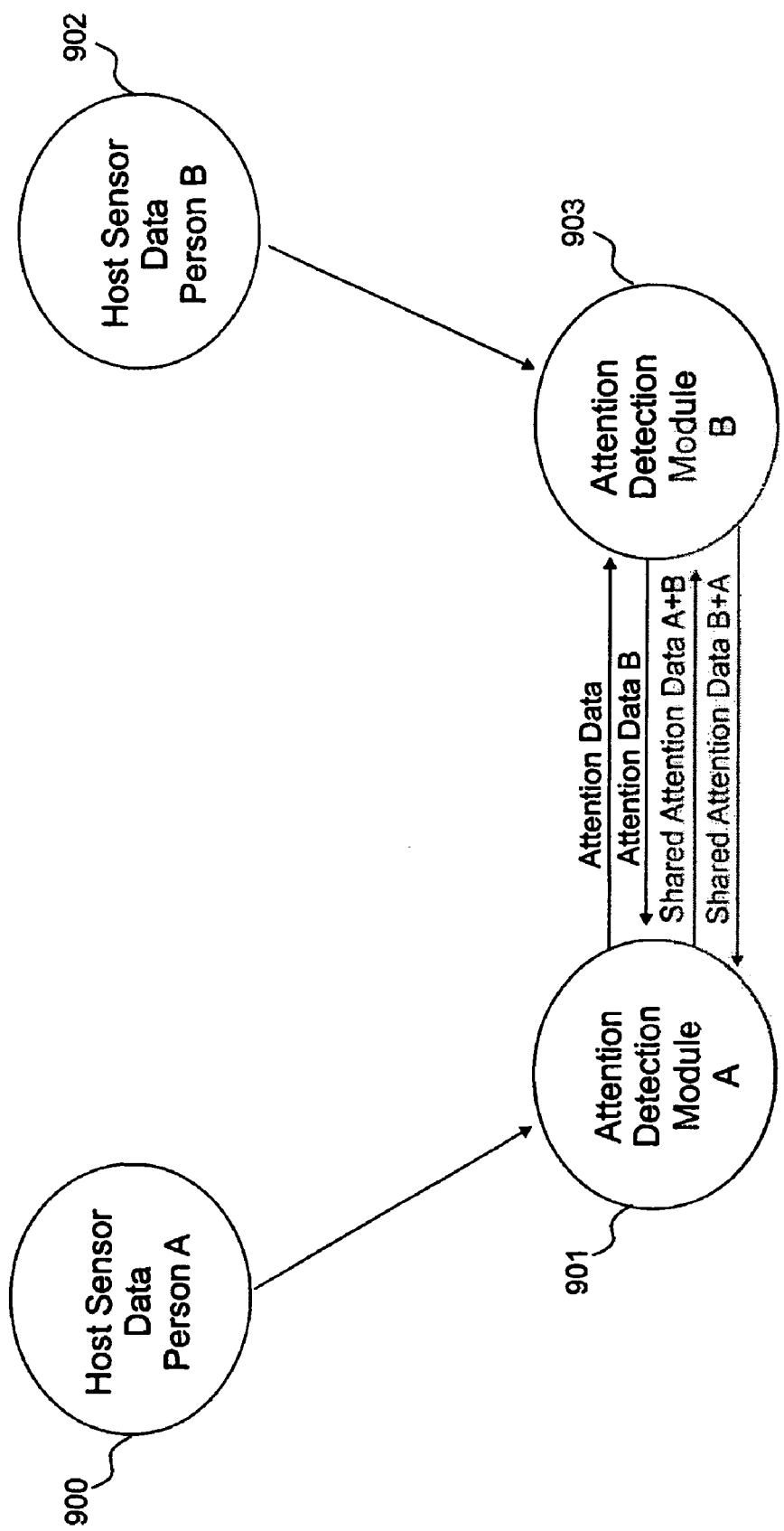
FIG. 9 is a flow diagram of operations associated with a second mode of operation of a pair or attention detection modules, wherein each module receives sensor data from a corresponding respective host person, and exchanges attention data between attention detection modules.

FIG. 9 is a flow diagram of second mode of operation of a pair of attention detection modules 218' and 218". Modules 901 and 903 perform pre-processing of sensor data 901 and 903, similar to modules 218' and 218". Modules 901 and 903 determine the focus of attention of host wearers A and B who respectively carry sensor systems 900 and 902, as well as modules 901 and 903. Each of sensor systems 900 and 902 is the same as the sensor system of FIG. 2, and thus includes sensors 204 and 210. Information is exchanged between attention detection modules 901 and 903 at a data processing stage after the respective module 901 or 903 has determined that an individual host wearer's attention has occurred.

Signals that sensors 900 generate are supplied to the attention detection module 901 that person A wears. Attention detection module 901 sends attention data describing the attention focus of person A to attention detection module 901 or to modules 901 and 903. Attention detection module 901 of the host person A also receives attention data from attention detection module 903 of host person B describing the focus of attention of person B. The attention detection module 901 of person A needs to receive attention focus data from module 903 and/or at least one other attention detection module to compare the attention focus data associated with sensors 900 and person A with the attention focus data of person B and/or one additional person(s) to determine whether a situation of shared attention exists. When attention detection module 901 determines that a situation of shared attention exists for person A and one or more other persons, then module 901 broadcasts a shared attention signal indicating that there is shared attention between the host wearer A and one or more other persons. Attention detection module 901 can also receive a shared attention signal from other attention detection modules, e.g., module 903. The shared attention signal indicates either (1) a shared attention situation between the host wearer person A and one or more other persons, or (2) a shared attention situation between two or more persons, none of whom is person A.

Figure 10:
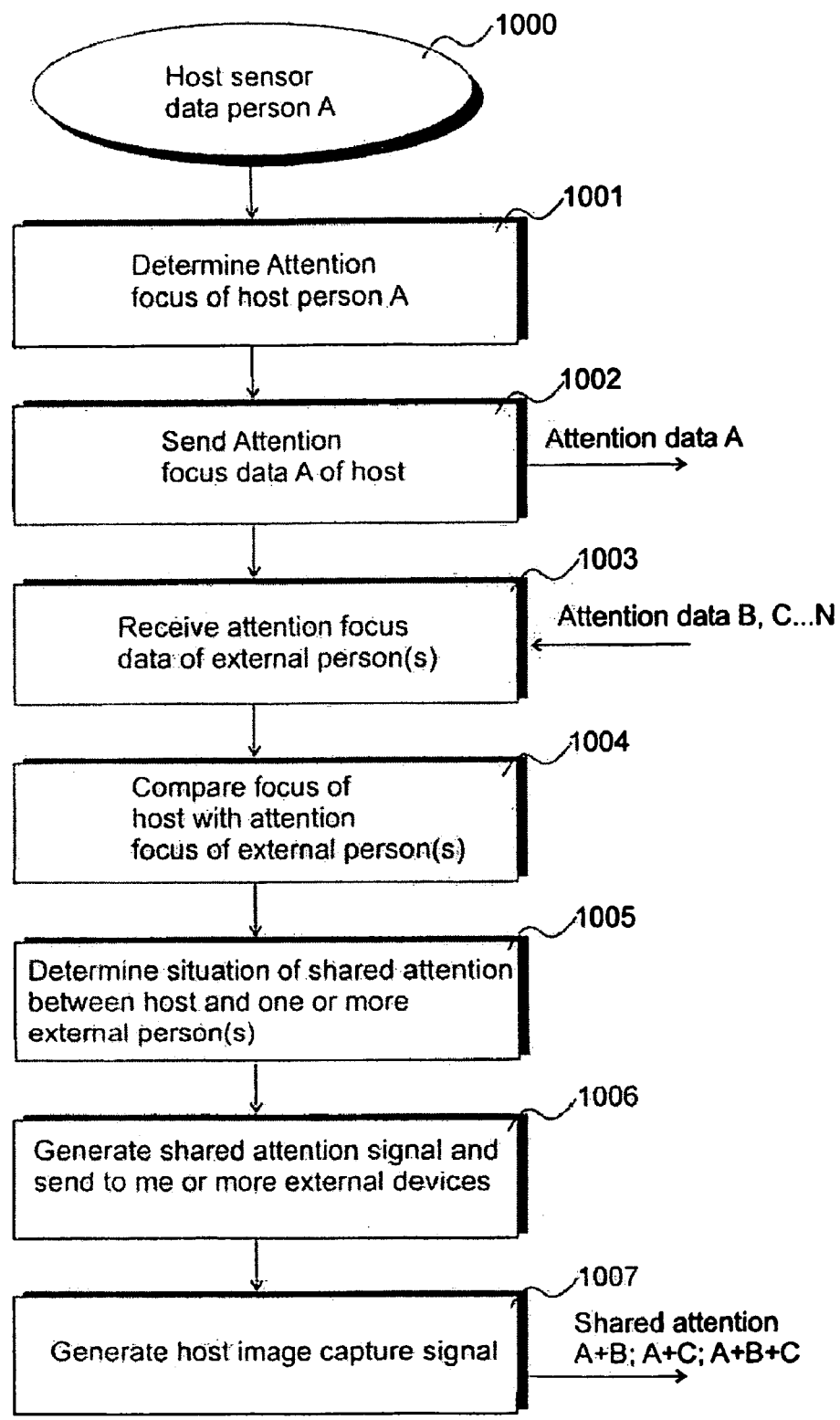
FIG. 10 is a flow diagram of a specific method of operation of an attention detection module operating in the second mode described with reference to FIG. 9 herein.

FIG. 10 is a more detailed flow diagram of operations that attention detection module 901 performs, based on operations of FIG. 9. During step 1000 attention detection module 901 receives host sensor data from sensors 900 of host person A. The attention detection module 901 determines the attention focus of the host person A as an ongoing process, step 1001. Having determined the attention focus of the host person A as an on-going continuous process, the module, during step 1002, broadcasts attention focus data of person A to one or more other attention detection modules. As a parallel process, attention detection module 901 (during step 1003) receives attention focus data associated with one or more persons other than person A (i.e. one or more external persons) from one or more external attention detection modules. The data from the external attention detection modules is received in the form of data fields comprising: an identification of the attention detection module; and data describing the attention focus of the external person wearing the external attention detection module. Many such signals can be received continuously from a plurality of external attention detection modules. Module 901 processes the signals from sensors 900 associated with person A and the signals from the external module(s) in parallel (step 1004) by comparing the attention focus data of the host person A with the attention focus data of the one or a plurality of external persons, i.e., persons B–N. If step 1004 indicates person A or one or more external persons B–N have attention to any situation or subject, the processor advances to step 1005. During step 1005, module 901 determines if the attention of person A and any other external person is focused on the same situation or subject. In response to step 1005 determining that person A and any other person are focusing on the same situation or subject, the processor of module 901 (1) stores signals indicating which external persons are focusing on the same situation or object as person A, and (2) advances to step 1006. During step 1006 module 901 generates a shared attention signal. The shared attention signal is broadcast to all the external modules, and/or sent to one or more specifically identified external modules from which attention data signals have been received. The shared attention signal includes data fields identifying host module 901, and one or more modules that host module 901 has determined are responsive to the same shared attention situation as person A. For example, if module 901 determines that shared attention exists between person A and two external persons B and C respectively, module 901 transmits shared attention signals indicating a shared attention situation between persons A+B, A+C, and between all three persons A+B+C.

The shared attention signal can be transmitted from module 901 to corresponding modules associated only with persons B and C by using frequency or coding modulation techniques that enable only the modules associated with persons B and C to be responsive to the signal that module 901 associated with person A transmits. The modules associated with persons B and C include receivers tuned to modulation frequencies associated with those modules, and transmitted from module 901, or decoders that respond only to codes associated with the modules for persons B and C.

Alternatively, module 901 broadcasts the signal to all the modules of persons B–N. In the later case, the signal that the module 901 associated with person A transmits includes a preamble with data indicative of the modules associated with persons B and C. The signal broadcast from module 901 is received by all of modules B–N. Modules B–N include circuitry that compares the preamble with a stored signal at each particular module; the stored signal is associated only with the particular module. In response to the preamble and the stored signal at a particular external module and the preamble for that external module being the same, the external module activates image capture device 202, as indicated by step 1007. Step 1007 also indicates image capture device 202 at module 901 is activated.

Thus, in the foregoing example, module 901, associated with person A, broadcasts a signal to the modules associated with persons B–N; the broadcasted signal includes a preamble indicating persons B and C share a common focus with person A. The broadcasted signal is received and processed by the modules associated with persons B–N. The modules associated with persons B and C store signals corresponding with the transmitted preamble data. The modules associated with persons B–N compare the signals stored in these modules with the preamble data indicating that persons B and C focus their attention on the same situation or object as person A. As a result of the comparison, the modules associated with persons A, B and C generate signals that simultaneously actuate an image capture device 202 separately carried by each persons A, B and C.

The attention detection module 901 can be based in part on the Barron-Cohen model. This model proposes the existence of a "mind reading" system in human brains which is able to interpret another individual's actions and infer the mental state of that other individual. In the Barron-Cohen model, there are at least four modules as follows:

(1) Intentionality detector, a primitive perceptual mechanism capable of interpreting self propelled motion. Situations, such as motions like "reaching for a pen" or "going towards a chair," are detected in terms of dyadic relationships, that is, a desire or goal, between a self propelled object (a human) and another, self-propelled or non-self propelled object, e.g., a pen or chair. Prior art research into the neuro physiological basis of this model has shown there are areas of the temporal cortex of the brain of certain species, that are sensitive to self propelled motion of other parties, but are insensitive to self induced motion such as that of their own limbs. The intentionality detector detects situations of self-propelled motion in terms of a dyadic relationship between a self-propelled object and another object.

(2) Eye direction detector, performs three basic pre-attentive functions: (a) detection of eye like stimuli; (b) computation of a gaze direction; and (3) attribution of the mental state of "seeing" to an agent looking towards an observer or another agent or object.

(3) Shared attention module; In the early stages of human brain development (9 to 18 months) a child starts to turn his attention to what his mother pays attention to. This activity is attributed to a shared attention module in a human brain. A specific embodiment of shared attention module 218 aims to produces a triadic relationship between an observer, an agent, and an object or subject of mutual attention to the observer and agent.

(4) Theory of mind module; The theory of mind module infers a range of mental states from observable behaviors of a host wearer and at least one other external person. The observable behaviors are then integrated by module 218 to explain and predict the behavior of other people.

The attention detection module 218 typically includes computer software that infers what a host person is attending to or paying attention to from observations of that host person, and one or more external persons. In normal situations, the software acts as an observer which can infer the attention and the intention of both the host wearer, and at least one other external person, by responding to their behaviors.

While there have been described and illustrated specific embodiments of the invention, it will be clear that variations in the details of the embodiments specifically illustrated and described may be made without departing from the true spirit and scope of the invention as defined in the appended claims. While the invention has been described in connection with "persons", many of the principles are applicable to other animate objects, such as animals and robots. It is to be understood that the term "image capture device" means devices that capture and record optical, sonic and olfactory phenomena that are drawn to the attention of animate objects.

The invention claimed is:

1. An attention detection system for detecting a condition of shared attention of first and second animate objects, said system comprising:
    a first body language detector for detecting body language of a first of the objects;
    a second body language detector for detecting body language of a second of the objects;
    an analyzer arranged for receiving body language information from said first and second body language detectors and for analyzing said body language of said first and second objects for determining that said body language information indicates a situation of shared attention between said first and second objects,
    said analyzer being arranged for determining the situation of shared attenuation by analyzing information exchanged between said first and second objects.

2. The attention detection system as claimed in claim 1, further comprising at least one image capture device arranged for capturing the image in response to the signal being generated by said analyzer.

3. The attention detection system as claimed in claim 2 wherein the image capture device includes an optical detector.

4. The attention detection system as claimed in claim 1, wherein said analyzer is arranged for (a) analyzing said body language of said first object from a first object perspective and (b) analyzing said body language of said second object from an observer perspective.

5. The attention detection system as claimed in claim 1 wherein the objects are persons.

6. The attention detection system as claimed in claim 5, wherein said body language detector comprises a sensor arrangement for at least one of:
    eye gaze direction sensor for detecting the direction of gaze of an optical detector of the person;
    a body direction sensor for sensing the direction of movement of the body of the person;
    a head motion sensor for sensing the direction of motion of a structure of the person carrying an optical detector;
    a limb orientation sensor for detecting the orientation direction of a limb of the person in three dimensions;
    a facial expression detector for detecting a facial expression of the person; and
    a sonic detector for detecting aspects of a noise originating from the person and which indicates a raised level of attention of said person.

7. The attention detection system as claimed in claim 5 wherein said body language detector comprises a sensor arrangement for all of:
    eye gaze direction sensor for detecting the direction of gaze of an optical detector of the person;
    a body direction sensor for sensing the direction of movement of the body of the person;
    a head motion sensor for sensing the direction of motion of a structure of the person carrying an optical detector;
    a limb orientation sensor for detecting the orientation direction of a limb of the person in three dimensions;
    a facial expression detector for detecting a facial expression of the person; and
    a sonic detector for detecting aspects of a noise originating from the person and which indicates a raised level of a attention of said person.

8. The attention detection system as claimed in claim 5 wherein said body language detector comprises a sensor arrangement for a plurality of:
    eye gaze direction sensor for detecting the direction of gaze of an optical detector of the person;
    a body direction sensor for sensing the direction of movement of the body of the person;
    a head motion sensor for sensing the direction of motion of a structure of the person carrying an optical detector;
    a limb orientation sensor for detecting the orientation direction of a limb of the person in three dimensions;
    a facial expression detector for detecting a facial expression of the person; and
    a sonic detector for detecting aspects of a noise originating from the person and which indicates a raised level of a attention of said person.

9. The attention detection system as claimed in claim 1, wherein said analyzer is capable of detecting a mutual presence between said first and second objects.

10. The attention detection system as claimed in claim 1, wherein said analyzer is adapted to be carried by one of said objects.

11. The attention detection system as claimed in claim 10 wherein the objects are persons.

12. A method of enabling shared attention to be detected between first and second animate objects, said method comprising:
    detecting attention information of said first object using a first device;
    detecting attention information of said second object using a second device; and
    exchanging said attention information between said first and second devices,
    wherein at least one of the detecting steps includes detecting a single final direction of attention shared by said first and second objects from a determination of detected joint ballistic direction information detected for each of said first and second objects.

13. The method of claim 12 further comprising indicating that said exchanged information is about the same attention getting phenomenon.

14. The method as claimed in claim 12 wherein the objects are persons.

15. The method as claimed in 14, wherein said exchanged information comprises information including at least one of the following:
    direction and gaze of optical detectors of the persons;
    direction of movement of the body of the persons;
    direction of movement of a structure of a body of each of the persons carrying optical detectors;
    orientation direction of a limb of each person in three dimensions;
    facial expression of the persons;
    noises originating from the persons; and
    indicating a raised level of attention of the persons.

16. The method as claimed in 14, wherein said exchanged information comprises information including all of the following:
    direction and gaze of optical detectors of the persons;
    direction of movement of the body of the persons;
    direction of movement of a structure of a body of each of the persons carrying optical detectors;
    orientation direction of a limb of each person in three dimensions;
    facial expression of the persons;
    noises originating from the persons; and
    indicating a raised level of attention of the persons.

17. The method as claimed in 14, wherein said exchanged information comprises information including a plurality of the following:
    direction and gaze of optical detectors of the persons;
    direction of movement of the body of the persons;
    direction of movement of a structure of a body of each of the persons carrying optical detectors;
    orientation direction of a limb of each person in three dimensions;
    facial expression of the persons;
    noises originating from the persons; and
    indicating a raised level of attention of the persons.

18. The method as claimed in claim 12, wherein the detecting step includes detecting a shared static point of common attention between said first and second objects, from an analysis of said shared information.

19. The method as claimed in claim 12, further comprising:
    determining a common change of direction of attention of said first and second objects.

20. The method as claimed in claim 12, wherein at least one of the detecting steps includes detecting a direction shift of a joint smooth gaze by said objects as a result of said objects following a moving object of shared attention.

21. The method as claimed in claim 12, further comprising:
    determining, by at least one of said objects, whether or not to send attention information to an attention information detecting device.

22. The method as claimed in claim 21 wherein the attention information detecting device is at a location different from the object that performs the determining step.

23. The method as claimed in claim 12, wherein each of said objects determines with whom it communicates said exchangeable information.

24. The method as claimed in claim 12, wherein each of said devices determines whether to exchange attention information with another of said devices, based upon an analysis of contextual information concerning the environment where said device is located.

25. The method as claimed in claim 12, further including determining whether or not to send said exchange information by analyzing information based upon the type of detected attention clue.

26. A method of capturing at least one image, in a situation of shared attention involving first and second animate objects, wherein the first and second objects are respectively first and second persons, said method comprising:
    monitoring at least one parameter associated with each of said objects;
    determining from the monitored parameters that said objects have a shared attention situation; and
    activating an image capture device in response to said determination of a shared attention situation,
    wherein said determined situation of shared attention comprises a shift of head direction for both of said persons, to a common attention point.

27. The method as claimed in claim 26 wherein the image capture device captures a replica of the shared attention situation.

28. The method as claimed in claim 26, wherein said parameter comprises:
    movement of a limb of said persons.

29. The method as claimed in claim 26, wherein said parameter comprises eye gaze direction of said persons.

30. The method as claimed in claim 26, wherein said parameter comprises an utterance by said persons.

31. The method as claimed in claim 26, wherein said parameter comprises head movement of said persons.

32. The method as claimed in claim 26 wherein said parameter comprises the pointing direction of a limb of said persons.

33. The method as claimed in claims 26 wherein said determined shared attention situation comprises a shared static attention point of said persons.

34. The method as claimed in claim 26 wherein determined situation of shared attention comprises:
    detecting a shift in head direction of both of said persons; and
    detecting a moving object within a field of view of each of said persons.

35. The method as claimed in claim 34, wherein said shift in head direction comprises a smooth and continuous change of head direction of each of said persons.

36. An image capture system capable of capturing images under conditions of shared attention between a plurality of animate objects, said system comprising:
   a wearable image capture device adapted to be worn by a first of the objects;
   a first set of sensors for detecting behavioral aspects of said first object;
   a second set of sensors for detecting behavioral aspects of a second of the objects;
   an analyzer for responding to the detected behavioral aspects sensed by the first and second set of body sensors and for determining a situation of shared attention between said first and second objects in response to the detected behavioral aspects sensed by the first and second set of body sensors, and for generating an image capture signal in response to the determination of the shared attention between said first and second objects.

37. The method as claimed in claim 36 wherein the first and second sets of sensors are adapted to sense body activity of the first and second objects, respectively.

38. The method as claimed in claim 37 wherein the objects are persons and the sensors are adapted to sense for each person at least one of limb movement, eye gaze direction, utterance, head movement, limb pointing direction and head pointing direction.

39. The method as claimed in claim 37 wherein the objects are persons and the sensors are adapted to sense for each person all of limb movement, eye gaze direction, utterance, head movement, limb pointing direction and head pointing direction.

40. An image capture system comprising:
   at least one image capture device;
   a first detector for detecting body language of a first animate object;
   a second detector for detecting body language of a second animate object;
   an analyzer for analyzing said body language of said first and second animate objects and for deriving a signal in response to said first and second detectors determining a situation of shared attention between said first and second animate objects;
   said image capture device being arranged for capturing an image of the shared attention between said first and second objects in response to the signal from said analyzer.

41. The system of claim 40 wherein the objects are persons.

42. The system of claim 41 wherein the image capture device includes an optical detector.

43. The system of claim 40 wherein the image capture device includes an optical detector.

* * * * *